United States Patent [19]
Wada et al.

[11] 3,818,023
[45] June 18, 1974

[54] 2-PHENYL BENZOTHIAZOLYL ACETIC ACID DERIVATIVES

[75] Inventors: Jin Wada, Kishigaya; Tadayuki Suzuki; Hiroki Miyamats, both of Tokyo, all of Japan

[73] Assignee: Tokyo Tanabe Company, Limited, Tokyo, Japan

[22] Filed: Sept. 8, 1971

[21] Appl. No.: 178,810

[30] Foreign Application Priority Data
June 24, 1971   Japan.............................. 46-45264

[52] U.S. Cl..................... 260/304, 260/299, 424/270
[51] Int. Cl............................................. C07d 91/44
[58] Field of Search............................ 260/304, 299

[56] References Cited
UNITED STATES PATENTS
3,300,507   1/1967   Sharpe et al........................ 260/304

*Primary Examiner*—Richard J. Gallagher
*Attorney, Agent, or Firm*—Toren and McGeady

[57] ABSTRACT

A compound of the formula

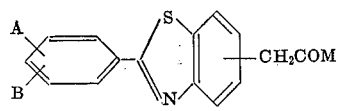

in which A as well as B are hydrogen, lower alkyl, hydroxy, lower alkoxy, halogen or di(lower alkyl)amino; M is OH, $NH_2$ or OZ where Z is alkali metal, aluminum, alkaline earth metal, diethylammonium, ethylenediammonium or triethanolammonium; and acetic acid radical is attached at the 5- or 6-position of benzothiazole ring. These compounds are useful for medicines and have anti-inflammatory activity, analgesic activity and antipyretic activity.

10 Claims, No Drawings

2-PHENYL BENZOTHIAZOLYL ACETIC ACID DERIVATIVES

This invention relates to a new class of compounds of the benzothiazole series. More particularly, it is concerned with new 2-phenyl-5 or 6-benzothiazolyl acetic acids and their salts and amide derivatives. It relates further to the synthesis of such substances.

The new 2-phenyl-5 or 6-benzothiazolyl acetic acid compounds of this invention have the general structural formula:

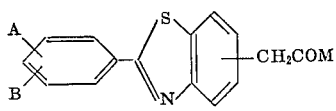

in which
  A may be hydrogen, lower alkyl, hydroxy, lower alkoxy, halogen or di(lower alkyl)-amino;
  B may be hydrogen, lower alkyl, hydroxy, lower alkoxy, halogen or di(lower alkyl)-amino;
  M may be OH, $NH_2$ or OZ where Z is a cation; and the acetic acid radical may be attached at the 5- or 6-position of the benzothiazole ring.

In the compounds of this invention, lower alkyl and alkoxy have from one to three carbon atoms. Examples of lower alkyl and alkoxy are methyl, ethyl, propyl, methoxy, ethoxy, propoxy and the like.

Examples of the halogen are chlorine, bromine and the like.

The salts and the amide derivatives of the new 2-phenyl-5 or 6-benzothiazolyl acetic acids represent an additional aspect of the invention. The salts of these benzothiazolyl acetic acids can be obtained by treatment of said free acid with base under mild conditions. In this manner there may be obtained alkaline metal salts such as the sodium and potassium, the aluminum salts or salts of alkaline earth metals such as calcium. Salts of organic amines such as diethylamine, ethylenediamine or triethanolamine may be obtained by reacting said free acid with the appropriate organic base. The amide derivatives of the free benzothiazolyl acetic acids are important intermediates in synthesizing said free acids, and in many cases are themselves useful as end products.

The 2-phenyl-5 or 6-benzothiazolyl acetic acid compounds of this invention are synthesized by performing the known Willgerodt Reaction with 2-phenyl-5 or 6-acetyl-benzothiazole compounds having the general structural formula:

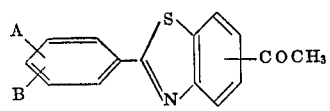

where A and B have the previously defined meanings and the acetyl radical is attached to the 5- or 6-position of the benzothiazole ring.

In particular, 2-phenyl-5 or 6-acetyl-benzothiazole compound is mixed with ammoniumpolysulfide and the mixture is heated in a sealed tube, so as to form the acid amide compound thereof. Such acid amide compounds can be hydrolized in routine manner to obtain the 2-phenyl-5 or 6-benzothiazolyl acetic acid compounds. However, the compounds of the invention are preferably synthesized by adopting the Kindler modification of said Willgerodt Reaction, in which a mixture of 2-phenyl-5 or 6-acetyl-benzothiazole compound with sulfur and secondary amine is heated under reflux and the resulting thioamide compound is hydrolyzed by being heated in water or in aqueous organic solvent together with acid or base, for 10–20 hours. The above 2-phenyl-5 or 6-acetyl-benzothiazole compounds used as principal raw material for synthesizing the new compounds of this invention may be obtained by reacting 2-amino-4 or 5-acetyl-thiophenol with benzaldehyde compound or benzoylchloride compound. As the secondary amines mentioned above, dimethylamine, morpholine, piperidine and the like, may be used.

The new compounds of this invention are useful for medicines, that is, they have good anti-inflammatory activity, analgesic activity and antipyretic activity. Tables 1–4 illustrate results of toxicological or pharmacological tests with the new compounds of the invention, of which Table 1 shows acute toxicity tests using mice (50 percent of Lethal Dose), Table 2 shows anti-inflammatory activity tests in oedema of the rat hindpaws induced by carrageenin, Table 3 shows analgesic activity tests in pain of mice induced by hot plate method as well as acetic acid-stretching method, and Table 4 shows antipyretic activity tests in hyperthermic rats induced by yeast.

TABLE 1

| Compounds tested | | | |
|---|---|---|---|
| A | B | Position of $CH_2CO_2H$ | $LD_{50}$(mg/kg) |
| H | H | 5 | 1365 p.o. |
| 4-N(CH$_3$)$_2$ | H | 5 | 900 p.o. |
| 2-OH | H | 5 | 450 i.p. |
| 4-Cl | H | 5 | 250 i.p. |
| H | H | 6 | 450 i.p. |
| 4-CH(CH$_3$)$_2$ | H | 6 | 400 i.p. |
| 2-OH | 3-CH$_3$ | 6 | 450 i.p. |
| phenylbutazone | | | 370 i.p. |

TABLE 2

| Compounds tested | | | |
|---|---|---|---|
| A | B | Position of $CH_2CO_2H$ | Inhibition rate (%) |
| H | H | 5 | 46.7 |
| 4-N(CH$_3$)$_2$ | H | 5 | 52.0 |
| 2-OH | H | 5 | 44.5 |
| 4-Cl | H | 5 | 35.3 |
| H | H | 6 | 39.5 |
| 4-CH(CH$_3$)$_2$ | H | 6 | 34.6 |
| 2-OH | 3-CH$_3$ | 6 | 25.0 |
| phenylbutazone | | | 45.3 |

TABLE 3

| Compounds tested | | | Inhibition rate (%) | |
|---|---|---|---|---|
| A | B | Position of $CH_2CO_2H$ | Hot plate method (400 mg/kg p.o.) | Acetic acid-stretching method (100 mg/kg p.o.) |
| H | H | 5 | 67.2 | 64.2 |
| 4-N(CH$_3$)$_2$ | H | 5 | 66.7 | 63.2 |
| H | H | 6 | 55.5 | 68.6 |
| 4-CH(CH$_3$)$_2$ | H | 6 | 35.8 | 43.3 |
| 3-OCH$_3$ | 4-OCH$_3$ | 6 | 71.0 | 44.4 |
| phenylbutazone | | | 50.0 | 63.6 |

TABLE 4

| Compounds tested | | | | Rectal temperature (°C) | |
|---|---|---|---|---|---|
| A | B | Position of $CH_2CO_2H$ | Dose (mg/kg) | Before | After |
| H | H | 5 | 100 | 38.5 ± 0.07 | 2 hours 37.1 ± 0.15 |
| H | H | 5 | 200 | 38.3 ± 0.19 | 4 hours 36.4 ± 0.09 |
| H | H | 6 | 100 | 38.3 ± 0.18 | 4 hours 37.3 ± 0.19 |
| acetyl salicylic acid | | | 100 | 38.4 ± 0.15 | 3 hours 37.6 ± 0.21 |
| acetyl salicylic acid | | | 200 | 38.3 ± 0.09 | 3 hours 36.3 ± 0.11 |
| control | | | | 38.3 ± 0.12 | |

The following examples serve to illustrate the invention without however limiting it:

EXAMPLE 1

2-(4'-methylphenyl)-5-benzothiazolyl acetic acid: 8.0 g. of 2-(4'-methylphenyl)-5-acetyl-benzothiazole and 1.25 g. of sulfur are added to 5.2 g. of morpholine, and the mixture is heated on a oil bath using reflux condenser for 20 hours. The reacted mixture is concentrated in vacuo to crystallize out 2-(4'-methylphenyl)-5-morpholinothiocarbonylmethyl-benzothiazole, which shows melting point of 176°-179°C after being recrystallized from ethanol.

The thioamide thus prepared is added to 100 ml. of 15 percent hydrochloric acid solution, and the liquid mixture is heated on a steam bath using reflux condenser for 30 hours, to hydrolyze said thioamide compound. A small amount of active carbon is added to the reacted solution, and the resulting liquid mixture is filtrated after having been heated. Dilute sodium-hydroxide solution is added little by little to said filtrate to adjust the pH thereof to 4–5, so as to crystallize out 2-(4'-methylphenyl)-5-benzothiazolyl acetic acid. Said crude crystals are recrystallized from a mixture of ethanol and water, whereby the melting point becomes 165°-167°C. The yield is 2.1 g. (24.8 percent of the theoretical amount). The elementary analysis (%) for $C_{16}H_{13}NO_2S$:

Calcd. C: 67.83 H: 4.27 N: 4.94

Found C: 67.63 H: 4.71 N: 5.22

EXAMPLE 2

2-(2'-hydroxyphenyl)-5-benzothiazolyl acetic acid: 2-(2'-hydroxyphenyl)-5-morpholinothiocarbonylmethyl-benzothiazole having melting point of 143–145°C is synthesized in the same way as in Example 1 except that 8.1 g. of 2-(2'-hydroxyphenyl)-5-acetyl-benzothiazole were used instead of 8.0 g. of 2-(4'-methylphenyl)-5-acetyl-benzothiazole.

The thioamide thus prepared is added to 10 percent sodium-hydroxide solution, and the liquid mixture is heated on a steam bath under reflux for 20 hours, to hydrolyze said thioamide compound. A small amount of active carbon is added to the reacted solution, and the resulting liquid mixture is filtrated after being heated. Dilute hydrochloric acid solution is added little by little to the said filtrate to crystallize out 2-(2'-hydroxyphenyl)-5-benzothiazolyl acetic acid. Said crude crystals are recrystallized from a mixture of ethanol and water, whereby the melting point becomes 215°-216°C. The yield is 4.5 g. (52.2 percent of the theoretical amount). The elementary analysis (%) for $C_{15}H_{11}NO_3S$:

Calcd. C: 63.15 H: 3.89 N: 4.91

Found C: 63.42 H: 3.64 N: 4.84

EXAMPLE 3

2-(4'-dimethylaminophenyl)-5-benzothiazolyl acetic acid: 20.5 g. of 2-(4'-dimethylaminophenyl)-5-acetyl-benzothiazole and 3.0 g. of sulfur are added to 50.0 g. of morpholine, and the mixture is heated on a oil bath under reflux for 30 hours. The reacted mixture is concentrated in vacuo to crystallize out 2-(4'-dimethylaminophenyl)-5-morpholinothiocarbonylmethyl-benzothiazole.

The thioamide thus prepared is added to 200 ml. of 35 percent hydrochloric acid solution, and the liquid mixture is heated on a steam bath under reflux for 30 hours, to hydrolyze said thioamide compound. A small amount of active carbon is added to the reacted solution, and the resulting liquid mixture is filtrated after being heated. The filtrate is allowed to stand in a refrigerator, to crystallize out yellow needles of 2-(4'-dimethylaminophenyl)-5-benzothiazolyl acetic acid hydrochloride, the decomposition point of which is 220°-221°C.

The hydrochloride obtained in the above is added to 700 ml. of water and the mixture is heated on a steam bath under reflux. The mixture was then allowed to stand in a refrigerator, to crystallize out yellow needles of 2-(4'-dimethylaminophenyl)-5-benzothiazolyl acetic acid, the melting point of which is 230°-231°C. The yield is 10.2 g. (43.0 percent of the theoretical amount). The elementary analysis (%) for $C_{17}H_{16}N_2O_2S$:

Calcd. C: 65.36 H: 5.16 N: 8.97

Found C: 65.28 H: 5.11 N: 8.86

EXAMPLE 4

2-phenyl-5-benzothiazolyl acetic acid: 10.0 g. of 2-phenyl-5-acetylbenzothiazole and 1.6 g. of sulfur are added to 20.0 g. of morpholine, and the mixture is heated on a oil bath under reflux for 20 hours. The reacted mixture is concentrated in vacuo to crystallize out 2-phenyl-5-morpholinothiocarbonylmethyl-benzothiazole. On recrystallizing said crude crystals from ethanol, the melting point becomes 157°–160°C.

The thioamide thus obtained is added to 100 ml. of 10 % potassium-hydroxide solution, and the mixture is heated on a steam bath under reflux for 20 hours. The reacted mixture is acidified with dilute hydrochloric acid solution to crystallize out 2-phenyl-5-benzothiazolyl acetic acid. Said crude crystals are recrystallized from a mixture of benzene and dioxan, whereby the melting point thereof becomes 178°–179°C. The yield is 6.7 g. (62.9 percent of the theoretical amount). The elementary analysis (%) for $C_{15}H_{11}NO_2S$:

Calcd. C: 66.90 H: 4.12 N: 5.20

Found C: 66.75 H: 4.14 N: 5.25

EXAMPLE 5

2-phenyl-5-benzothiazolyl acetic acid: 2.53 g. of 2-phenyl-5-acetylbenzothiazole and 13 ml. of ammoniumpolysulfide solution (yellow) are added to 10 ml. of dioxan, and the mixture is heated in a sealed tube at a furnace temperature of 155°–165°C for 10 hours. The resulting mxiture is cooled to crystallize out yellow needles of 2-phenyl-5-benzothiazolyl acetamide. Said crude crystals are recrystallized from methanol after the methanol solution has been clarified by filtration with a small amount of active carbon, whereupon the thus prepared crystals are recrystallized from a mixture of benzene and dioxan, whereby the melting point of the final crystals becomes 206°–207°C. The yield of said acetamide compound is 2.2 g. (82.1 percent of the theoretical amount). The elementary analysis (%) for $C_{15}H_{12}N_2OS$:

Calcd. C: 67.14 H: 4.51 N: 10.44

Found C: 66.98 H: 4.43 N: 10.18

The acetamide thus prepared is added to 10 ml. of 20 percent hydrochloric acid solution, and the liquid mixture is heated on a steam bath under reflux for 10 minutes, to crystallize out 2-phenyl-5-benzothiazolyl acetic acid. On recrystallizing said crude crystals from a mixture of benzene and dioxan, the melting point becomes 178°–179°C. The yield is 1.8 g. (81.7 percent of the theoretical amount). The elementary analysis (%) for $C_{15}H_{11}NO_2S$:

Calcd. C: 66.90 H: 4.12 N: 5.20

Found C: 66.86 H: 4.05 N: 5.22

EXAMPLE 6

2-phenyl-6-benzothiazole acetic acid: 2-phenyl-6-morpholinothiocarbonylmethylbenzothiazole having melting point of 181°–182°C is synthesized in the same way as in Example 4 except that 2-phenyl-6-acetyl-benzothiazole instead of 2-phenyl-5-acetyl-benzothiazole is used.

Further, the thioamide thus prepared is treated in the same way as in Example 4 to obtain 2-phenyl-6-benzothiazolyl acetic acetic having melting point of 173°–175°C. The yield is 6.2 g. (58.8 percent of the theoretical amount). The elementary analysis (%) for $C_{15}H_{11}NO_2S$:

Calcd. C: 66.90 H: 4.12 N: 5.20

Found C: 66.71 H: 4.08 N: 5.28

EXAMPLE 7

2-(2'-hydroxy-3'-methylphenyl)-6-benzothiazolyl acetic acid: 7.8 g. of 2-(2'-hydroxy-3'-methylphenyl)-6-acetyl-benzothiazole and 1.5 g. of sulfur are added to 20.0 g. of morpholine, and the mixture is heated on a oil bath under reflux for 20 hours. The reacted mixture is concentrated in vacuo to crystallize out 2-(2'-hydroxy-3'-methylphenyl)-6-morpholinothiocarbonylmethyl-benzothiazole. On recrystallization thereof from ethanol the melting point becomes 175°C.

The thioamide thus prepared is added to 80 ml. of 10 percent potassium-hydroxide solution, and the liquid mixture is heated on a steam bath under reflux for 23 hours. The reacted solution is acidified with dilute hydrochloric acid solution, to crystallize out 2-(2'-hydroxy-3'-methylphenyl)-6-benzothiazolyl acetic acid. On recrystallization thereof from a mixture of benzene and dioxan the melting point becomes 206°–207°C. The yield is 5.0 g. (60.7 percent of the theoretical amount). The elementary analysis (%) for $C_{16}H_{13}NO_3S$:

Calcd. C: 64.20 H: 4.38 N: 4.68

Found C: 64.22 H: 4.63 N: 4.84

EXAMPLE 8

2-(4'-methoxyphenyl)-6-benzothiazolyl acetic acid: 2-(4'-methoxyphenyl)-6-morpholinothiocarbonylmethyl-benzothiazole having the melting point of 163.5°–164.5°C is synthesized in the same way as in Example 7 except 10.4 g. of 2-(4'-methoxyphenyl)-6-acetyl-benzothiazole is used instead of 7.8 g. of 2-(2'-hydroxy-3'-methylphenyl)-6-acetyl-benzothiazole.

The thioamide thus prepared is hydrolyzed in the same way as in Example 3 except that the filtrate of the reacted solution has been poured into ice water instead of cooling the filtrate of the same in a refrigerator, and hydrochloric acid salt of 2-(4'-methoxyphenyl)-6-benzothiazolyl acetic acid is obtained.

The thus obtained hydrochloride is treated in the same way as in Example 3 except that 300 ml. of water instead of 700 ml. is used, and 2-(4'-methoxyphenyl)-6-benzothiazolyl acetic acid is obtained. On recrystallizing said benzothiazole acetic acid from aceton, the melting point thereof becomes 151°–153°C. The yield is 4.4 g. (40.5 percent of the theoretical amount). The elementary analysis (%) for $C_{16}H_{13}NO_3S$:

Calcd. C: 64.20 H: 4.38 N: 4.68
Found C: 64.38 H: 4.31 N: 4.92

EXAMPLE 9

2-phenyl-6-benzothiazolyl acetic acid: 6.0 g. of 2-phenyl-6-acetylbenzothiazole and 30.8 ml. of ammoniumpolysulfide solution (yellow) are added to 24 ml. of dioxan, and the mixture is heated in a sealed tube at a furnace temperature of 150°–160°C for 10 hours. The resulting mixture is cooled to crystallize out yellow needles of 2-phenyl-6-benzothiazolyl acetamide. Said crude crystals are recrystallized from ethanol after the ethanol solution has been clarified by filtration with a small amount of active carbon, whereupon the thus prepared crystals are recrystallized from dioxan, whereby the melting point of the final crystals becomes 229°–230°C. The yield of said acetamide compound is 5.3 g. (83.5 percent of the theoretical amount). The elementary analysis (%) for $C_{15}H_{12}N_2OS$:

Calcd. C: 67.14 H: 4.51 N: 10.44
Found C: 67.21 H: 4.38 N: 10.39

The acetamide thus prepared is added to 30 ml. of 20 percent hydrochloric acid solution, and the liquid mixture is heated on a steam bath under reflux for 20 minutes, to crystallize out 2-phenyl-6-benzothiazolyl acetic acid. On recrystallization thereof from a mixture of benzene and dioxan the melting point becomes 173°–175°C. The yield is 4.4 g. (82.8 percent of the theoretical amount). The elementary analysis (%) for $C_{15}H_{11}NO_2S$:

Calcd. C: 66.90 H: 4.12 N: 5.20
Found C: 66.88 H: 4.08 N: 5.25

EXAMPLE 10

In the same way as in the preceding Examples, the following compounds are synthesized:

2-(4'-isopropylphenyl)-5-benzothiazolyl acetic acid (m.p. 148°–150°C),
2-(4'-methoxyphenyl)-5-benzothiazolyl acetic acid (m.p. 182°–184°C),
2-(3', 4'-dimethoxyphenyl)-5-benzothiazolyl acetic acid (m.p. 206°–207°C),
2-(3'-chlorophenyl)-5-benzothiazolyl acetic acid (m.p. 164°–166°C),
2-(4'-chlorophenyl)-5-benzothiazolyl acetic acid (m.p. 213°–215°C),
2-(2'-hydroxyphenyl)-6-benzothiazolyl acetic acid (m.p. 206°–207°C),
2-(4'-hydroxyphenyl)-6-benzothiazolyl acetic acid (m.p. 248°–250°C),
2-(4'-methylphenyl)-6-benzothiazolyl acetic acid (m.p. 198°–200°C),
2-(3'-methylphenyl)-6-benzothiazolyl acetic acid (m.p. 216°–218°C),
2-(3', 4'-dimethoxyphenyl)-6-benzothiazolyl acetic acid (m.p. 177°C),
2-(2', 4'-dichlorophenyl)-6-benzothiazolyl acetic acid (m.p. 106°–108°C),
2-(2'-chlorophenyl)-6-benzothiazolyl acetic acid (m.p. 153.5°–155.5°C),
2-(4'-dimethylaminophenyl)-6-benzothiazolyl acetic acid (m.p. 212°–214°C),
2-(4'-isopropylphenyl)-6-benzothiazolyl acetic acid (m.p. 162°–163°C).

What is claimed is:

1. A compound of the formula:

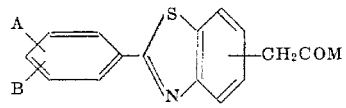

in which
A is one member selected from the group consisting of hydrogen, lower alkyl, hydroxy, lower alkoxy, halogen and di(lower alkyl)amino;
B is one member selected from the group consisting of hydrogen, lower alkyl, hydroxy, lower alkoxy, halogen and di(lower alkyl)amino;
M is one member selected from the group consisting of OH, $NH_2$ and OZ where Z is alkali metal, aluminum, alkaline earth metal, diethylammonium, ethylenediammonium or triethanolammonium; and acetic acid radical is attached at the 5- or 6-position of benzothiazole ring.

2. A compound as claimed in claim 1, where lower alkyl is methyl, ethyl or propyl.
3. A compound as claimed in claim 1, where lower alkoxy is methoxy, ethoxy or propoxy.
4. A compound as claimed in claim 1, where halogen is chlorine or bromine.
5. A compound as claimed in claim 1, where B is hydrogen, M is OH, acetic acid radical is attached at the 5-position of benzothiazole ring, and A is one member selected from the group consisting of hydrogen, 3'-chloro, 4'-chloro, 2'-hydroxy, 4'-methyl, 4'-isopropyl, 4'-methoxy and 4'-dimethylamino.
6. A compound as claimed in claim 1, where B is hydrogen, M is OH, acetic acid radical is attached at the 6-position of benzothiazole ring, and A is one member selected from the group consisting of hydrogen, 2'-chloro, 2'-hydroxy, 4'-hydroxy, 3'-methyl, 4'-methyl, 4'-isopropyl, 4'-methoxy and 4'-dimethylamino.
7. A compound as claimed in claim 1, where A as well as B are hydrogen, M is $NH_2$, and acetic acid radical is attached at the 5- or 6-position of benzothiazole ring.
8. A compound as claimed in claim 1, where A is 3'-methoxy, B is 4'-methoxy, M is OH, and acetic acid radical is attached at the 5- or 6-position of benzothiazole ring.
9. A compound as claimed in claim 1, where A is 2'-hydroxy, B is 3'-methoxy, M is OH, and acetic acid radical is attached at the 6-position of benzothiazole ring.
10. A compound as claimed in claim 1, where A is 2'-chloro, B is 4'-chloro, M is OH, and acetic acid radical is attached at the 6-position of benzothiazole ring.

* * * * *

UNITED STATES PATENT OFFICE
CERTIFICATE OF CORRECTION

Patent No. 3,818,023　　　　　　　Dated June 18, 1974

Inventor(s) Jin Wada et al

It is certified that error appears in the above-identified patent and that said Letters Patent are hereby corrected as shown below:

In the heading of the patent:

The surname of the third inventor should read

--Miyamatsu--.

Add to the recitation of the foreign application priority data:

--Sept. 11, 1970 Japan...........79,325/1970.--

Signed and sealed this 8th day of October 1974.

(SEAL)
Attest:

McCOY M. GIBSON JR.　　　　　　　C. MARSHALL DANN
Attesting Officer　　　　　　　　Commissioner of Patents